United States Patent
Guvenc et al.

(10) Patent No.: US 8,345,629 B2
(45) Date of Patent: Jan. 1, 2013

(54) METHOD FOR ARQ-ENABLED PRE-TRANSMISSIONS IN MULTICAST AND BROADCAST SERVICES OF RELAY NETWORKS UTILIZING THE IDLE PERIODS

(75) Inventors: Ismail Guvenc, Santa Clara, CA (US); Moo Ryong Jeong, Albany, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 577 days.

(21) Appl. No.: 12/211,611

(22) Filed: Sep. 16, 2008

(65) Prior Publication Data

US 2009/0086666 A1  Apr. 2, 2009

Related U.S. Application Data

(60) Provisional application No. 60/975,084, filed on Sep. 25, 2007.

(51) Int. Cl.
 *H04W 4/00* (2009.01)
 *H04L 12/26* (2006.01)
 *H04L 1/00* (2006.01)
 *H04J 1/16* (2006.01)
 *H04J 3/14* (2006.01)
 *H04H 20/71* (2008.01)

(52) U.S. Cl. ........ 370/331; 370/231; 370/235; 370/242; 370/312; 370/328; 370/338

(58) Field of Classification Search .................. 370/229, 370/230.1, 231, 235, 241, 242, 310, 312, 370/328, 331, 338, 351, 389

See application file for complete search history.

(56) References Cited

PUBLICATIONS

Cai, "A proposal for synchronous MBS transmission in MR", IEEE, Jan. 18, 2007, all pages.*
802.16j, "802.16j: Multihop Relay Specification", IEEE, Jun. 6, 2007, all pages.*
Yang Liu, et al., Synchronous MBS Transmission for Macro Diversity in MR Networks, IEEE 802.16 Broadband Wireless Access Working Group <http://ieee800.org/16>, Jul. 5, 2007, 9 pages.
Youngbin Chang, et al., Minimum Change to Apply ARQ in Relay Link, IEEE 802.16 Broadband Wireless Access Working Group <http://ieee802.org/16>, Mar. 15, 2008, 3 pages.
Relay Task Group of IEEE 802.16, et al., Part 16: Air Interference for Fixed and Mobile Broadband Wireless Access Systems, Baseline Document for Draft Standard for Local and Metropolitan Area Networks, Apr. 10, 2007, 126 pages.
Gang Shen, et al., Comments on Synchronous MBS Transmission in MR Networks, IEEE Broadband Wireless Access Working Group <http://ieee802.org/16>, Jul. 5, 2007, 4 pages.

(Continued)

*Primary Examiner* — Andrew Lai
*Assistant Examiner* — Adam Duda
(74) *Attorney, Agent, or Firm* — Blakely, Sokoloff, Taylor & Zafman LLP

(57) ABSTRACT

A method and apparatus is disclosed herein for transmitting data in a network (e.g., a relay network). In one embodiment, the method comprises performing pre-transmission of a packet to hops to enable the base station and the plurality of hops to transmit the packet synchronously to one or more mobile stations in the wireless communication system; and performing one or more re-transmissions of the packet at a first set of one or more hops in the system during a delay due to pre-transmissions at a second set of one or more hops in the system.

22 Claims, 7 Drawing Sheets

OTHER PUBLICATIONS

PCT International Search Report for PCT Patent Application No. PCT/US2008/076693, Mar. 26, 2009, 3 pages.

PCT Written Opinion of the International Searching Authority for PCT Patent Application No. PCT/US2008/076693, Mar. 26, 2009, 9 pages.

International Preliminary Report on Patentability for corresponding PCT Patent Application No. PCT/US2008/076693, Apr. 8, 2010, 10 pgs.

Cheng, Weijun, et al., "Performance Analysis of Cooperative Macro-diversity in Mobile Cellular Networks," IEEE 6th CAS Symposium on Emerging Technologies: Mobile and Wireless Communications, Shanghai, China, May 31-Jun. 2, 2004, pp. 133-136.

Valenti, Matthew C., et al., "Exploiting Macrodiversity in Dense Multihop Networks and Relay Channels," Proceedings of the IEEE Vehicular Technology Conference: VTC '02 Fall (Vancouver, BC), 2003, pp. 1877-1882.

Jeon, Sungho, et al., "A Relay-Assisted Handover Technique with Network Coding over Multihop Cellular Networks," IEEE Communications Letters, vol. 11, No. 3, Mar. 2007, pp. 252-254.

* cited by examiner

✓ Packet Not Corrupted
✗ Packet Corrupted

```
┌─────────────────────────────────────────────┐
│   Construct a tree structure depicting a topology of a │
│  wireless communication network having at least one base│
│        station and a plurality of relay stations        │
│                      1001                               │
└─────────────────────────────────────────────┘
                          │
┌─────────────────────────────────────────────┐
│    Select a set of one or more relay stations from the  │
│              plurality of relay stations                │
│                      1002                               │
└─────────────────────────────────────────────┘
                          │
┌─────────────────────────────────────────────┐
│   Determine a maximum delay for each relay station in   │
│   the selected set of relay stations, where the maximum │
│   delay is a period of time in which at least one request│
│   for re-transmission of a packet and the receipt of the│
│        packet after re-transmission can occur           │
│                      1003                               │
└─────────────────────────────────────────────┘
                          │
┌─────────────────────────────────────────────┐
│      Allow each of the selected set of relay stations to│
│   request re-transmissions from their parent relay station│
│   or the base station during idle periods in which said │
│   each relay station is waiting for pre-transmissions of│
│   packets to arrive at other relay stations in the network│
│                      1004                               │
└─────────────────────────────────────────────┘
```

Figure 10

METHOD FOR ARQ-ENABLED PRE-TRANSMISSIONS IN MULTICAST AND BROADCAST SERVICES OF RELAY NETWORKS UTILIZING THE IDLE PERIODS

PRIORITY

The present patent application claims priority to and incorporates by reference the corresponding provisional patent application Ser. No. 60/975,084, titled, "A METHOD FOR ARQ-ENABLED PRE-TRANSMISSIONS IN MULTICAST AND BROADCAST SERVICES OF RELAY NETWORKS UTILIZING THE IDLE PERIODS," filed on Sep. 25, 2007.

FIELD OF THE INVENTION

The present invention relates in general to network communication of information; more specifically, the present invention relates to using idle periods due to pre-transmissions of information in multi-hop networks to obtain re-transmissions of information.

BACKGROUND OF THE INVENTION

Importance of macro-diversity in relay networks has been analyzed and discussed previously in the literature. Macro-diversity may be achieved by broadcasting the data to some relay stations (RSs) (which form a virtual antenna array), one (or some) of which can then forward it to a mobile station (MS). Since the relay stations are distributed spatially, it is assumed that at least one of the relay stations will have sufficiently good channel with both the base station (BS) and the mobile station even when the mobile station is in motion.

Network coding has been employed in a relay network so that the mobile stations can achieve more reliable macro-diversity with the help of a relay-based handover technique. Each mobile station receives the data from the home base station, as well as a network-coded version of the data from the neighboring base station through a relay station. This helps the mobile station while switching from the home base station to the neighbor base station.

A cooperative macro-diversity system for mobile cellular networks has been considered, where the mobile station communicates with the nearest base station directly, and with other base stations through multi-hop relaying (i.e., through another relay station). Compared to a system with single-hop macro-diversity (i.e., the mobile station receives multiple signals directly from all the base stations and there is no relay station assisting in communication), the outage performance and bit error probability can be improved considerably.

The techniques discussed above do not address how multiple transmitters get synchronized before transmitting the packets to the mobile station. Also, they do not consider Multicast and broadcast services (MBS) scenarios.

MBS in today's wireless systems (e.g., IEEE 802.16j wireless standard) typically require synchronization of multiple base stations and/or relay stations in order to achieve macro-diversity. This requires pre-transmission of the packets to the relay stations for synchronization purposes. However, the pre-transmission phase may take longer for some of the relay stations whose number of hops to the base station may be larger than the other relay stations. Therefore, some of the relay stations that are closer to the base station in the tree structure may have to wait in an idle state for the pre-transmissions to propagate to all of the relay stations and until the synchronization is achieved. Then, at a pre-determined target transmission frame, the packets are transmitted synchronously to the mobile station.

Two different techniques are proposed in the IEEE 802.16j baseline document for the synchronization of the relay stations and the base station in MBS. First, the synchronization is achieved by using pre-defined relative transmission times. Each of the relay stations first report its processing delay, $D_R$, to the multi-hop relay (MR)-base station as a capability parameter. The MR-base station then determines the maximum cumulative delay, $D_M$, of all the relay stations, based on their individual delays and their positions in the tree. Then, the waiting times $W_i$ of each of the relay stations (i.e., the waiting time before transmitting synchronously to the mobile station) are calculated and notified to the relay stations.

As an alternative, in the second technique, the MBS data synchronization is achieved using only the target transmission times, which is still determined based on the parameter $D_M$. In other words, rather than the relative waiting time, the relay stations are notified about the absolute transmission time where they should transmit to the mobile station. Note that in both of these synchronization approaches, pre-transmissions may be handled in a unicast or multicast manner.

While synchronization techniques for simultaneous transmission of the packets to the mobile station are presented in these two techniques, none of the two techniques employ ARQ in the relay links to improve the reliability. In other words, when a packet is corrupted, it is simply discarded at the relay station. If this relay station is serving to a large number of mobile stations, the discarded packets will not be received by any of the mobile stations served by this relay station. Also, with these two techniques, some of the relay stations (closer to the base station in the tree) have to wait for the pre-transmissions to propagate to all the relay stations.

A reliable multicast method has been proposed for a relay network, where some critical relay stations are allowed to send back ACK/NACK messages in a multicast connection. The state diagram of a conventional ARQ mechanism is changed so that, the transmitter requires to get ACK/NACK from all the critical relay stations before the state of a packet goes into the "Done" state. While it improves the overall capacity by transmitting to multiple destinations at the same time, it can slow down some relay stations that are successfully receiving the packets, but has to wait for re-transmissions of some other relay stations. Also, some criteria for the selection of critical relay stations are proposed; these criteria are chosen specifically to address multicast connections that use an ARQ mechanism, and not unicast connections.

SUMMARY OF THE INVENTION

A method and apparatus is disclosed herein for transmitting data in a network (e.g., a relay network). In one embodiment, the method comprises performing pre-transmission of a packet to hops to enable the base station and the plurality of hops to transmit the packet synchronously to one or more mobile stations in the wireless communication system; and performing one or more re-transmissions of the packet at a first set of one or more hops in the system during a delay due to pre-transmissions at a second set of one or more hops in the system.

BRIEF DESCRIPTION OF THE DRAWINGS

The present invention will be understood more fully from the detailed description given below and from the accompanying drawings of various embodiments of the invention.

FIG. 10 is a method for handling re-transmissions of packets.

DETAILED DESCRIPTION OF THE PRESENT INVENTION

Figure 1A:
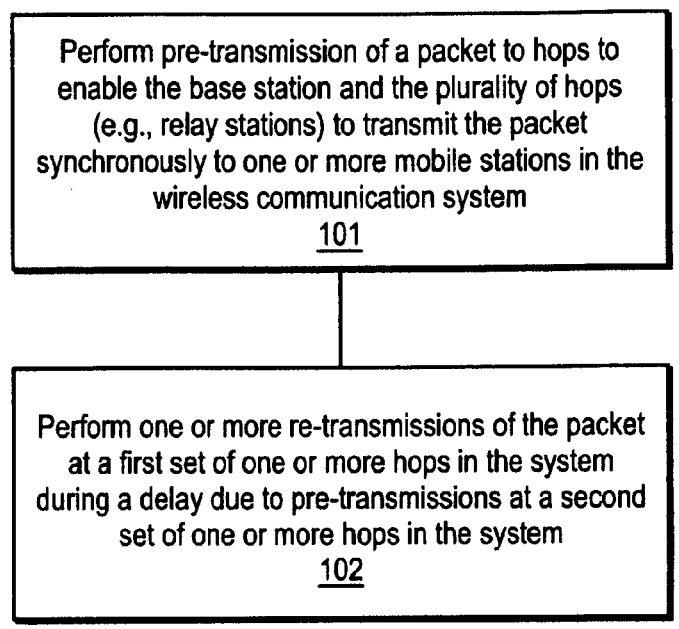
FIG. 1A is a flow diagram of one embodiment of a process for using idle periods during pre-transmissions one or more nodes to have one or more re-transmissions to at least one other node.

A method, apparatus and system are disclosed in which relay stations that are at upper levels in the tree structure depicting a communication network having at least one base station and multiple relay stations can utilize their idle periods by requesting re-transmissions from their parent relay stations or the base station in order to improve their link-level reliability. In one embodiment, the re-transmissions are part of an automatic repeat request (ARQ) process. In one embodiment, all the re-transmissions are finished before the target transmission frame where all the relay stations (and the base station) should synchronously transmit to the mobile station. Using such an ARQ mechanism may greatly improve the data reliability without introducing any additional latency to MBS packets.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1A is a flow diagram of one embodiment of a process for using idle periods during pre-transmissions one or more nodes to have one or more re-transmissions to at least one other node. The process is performed by processing logic that may comprise hardware (circuitry, dedicated logic, etc.), software (such as is run on a general purpose computer system or a dedicated machine), or a combination of both. In one embodiment, the process is used in a wireless communication system having at least one base station and a plurality of hops (e.g., relay stations).

Referring to FIG. 1, the process begins by processing logic performing pre-transmission of a packet to hops to enable the base station and the plurality of hops (e.g., relay stations) to transmit the packet synchronously to one or more mobile stations in the wireless communication system (processing block 101). In one embodiment, the pre-transmissions are unicast pre-transmissions.

Next, processing logic performs one or more re-transmissions of the packet at a first set of one or more hops in the system during a delay due to pre-transmissions at a second set of one or more hops in the system (processing block 102). In one embodiment, the first set of one or more hops is closer to the base station than the second set of hops. In one embodiment, performing one or more re-transmissions of the packet comprises performing the one or more re-transmissions of the packet to one or more relay stations during idle periods in which the one or more relay stations are waiting for one or more pre-transmissions of the packet to propagate to at least one other relay station. These re-transmissions are finished before a target transmission time at which the base station and the relay stations transmit the packet synchronously to the mobile stations. In one embodiment, the idle periods are used for automatic repeat request (ARQ) with the re-transmissions being part of the ARQ process. In one embodiment, the re-transmissions are performed using HARQ, instead of ARQ.

In one embodiment, the method further comprises selecting the one or more relay stations, based on depth of each relay station in a tree structure representing the topology of the wireless communication network in comparison to a total tree depth of the tree structure, for use of one or more re-transmissions if the packet is not received correctly. In another embodiment, the method further comprises selecting the one or more relay stations, based on a number of mobile stations served by each relay station, for use of one or more re-transmissions if the packet is not received correctly. In yet another embodiment, the method further comprises selecting the one or more relay stations, based on channel quality of a channel to each relay station from either another relay station or the base station, for use of one or more re-transmissions if the packet is not received correctly.

In one embodiment, performing one or more re-transmissions comprises performing at a predetermined number of re-transmissions to at least one relay station. In one embodiment, a first relay station of the group of relay stations is allowed a greater number of re-transmissions than a second relay station. In one embodiment, this first relay station is closer to the base station than the second relay station.

Figure 1B:
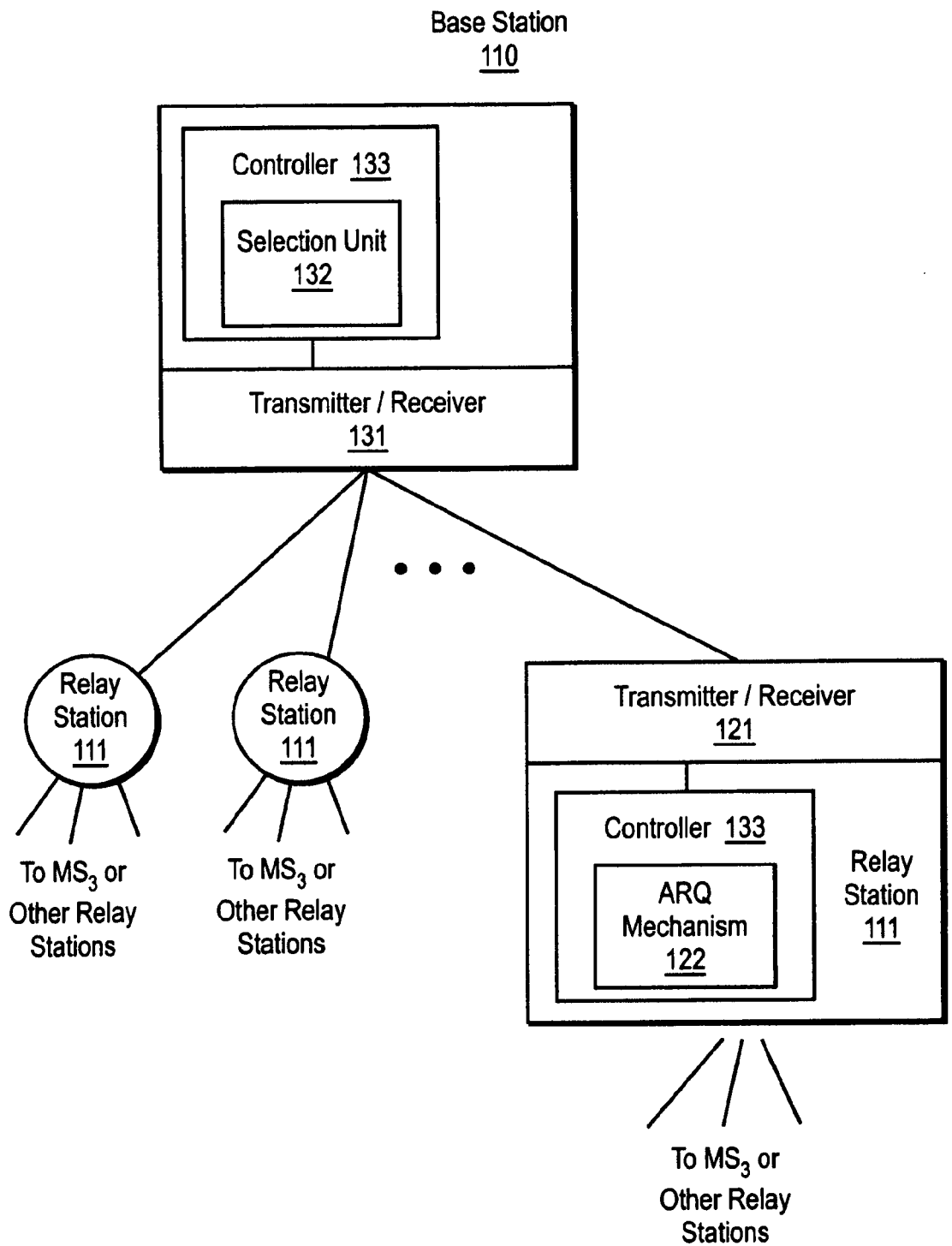
FIG. 1B is a block diagram of a wireless communication system with relay stations.

FIG. 1B is a block diagram of a wireless communication system having at least one base station 110 and multiple relay stations 111. Base station 110 and one or more of the relay stations 111 pre-transmit a packet to other relay stations to enable base station 110 and the relay stations 111 to transmit a packet synchronously to one or more mobile stations in the system. In one embodiment, a relay station comprises a transmitter/receiver 121 to receive pre-transmitted packets and a repeat request mechanism (e.g., ARQ mechanism) 122 that is part of the relay station controller 123 to request a re-transmission of a pre-transmitted packet if the pre-transmitted packet is not received correctly by transmitter/receiver 121. The repeat request mechanism 122 is operable to request the re-transmission while waiting for other pre-transmissions of the packet to complete. In one embodiment, base station 110 comprises a transmitter/receiver 131 to send pre-transmitted packets and a selection unit 132 that is part of the base station controller 133 to select one or more relay stations (e.g., relay station 111) to enable use of their respective repeat request mechanisms to receive one or more re-transmissions of a packet if the packet is not received correctly.

ARQ-Enabled Pre-Transmissions

In one embodiment, ARQ-enabled unicast pre-transmissions are used in conjunction with the idle wait period for some relay stations to improve data reliability. For purposes herein such relay stations are referred to as opportunistic relay stations (ORSs) due to the idle time opportunity which can be utilized to improve the reliability of the data. The details of various embodiments of this approach are described below followed by an example.

Initialization of the ORSs and Other Parameters at the Base Station

Figure 2:
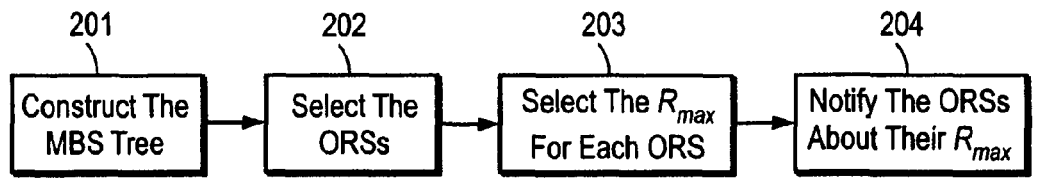
FIG. 2 is a flow diagram illustrating a process for selection of opportunistic relay stations (ORSs) and $R_{max}$ performed by a base station.

FIG. 2 is a flow diagram illustrating a process for selection of opportunistic relay stations (ORSs) and $R_{max}$ performed by a base station. The process is performed by processing logic that may comprise hardware (circuitry, dedicated logic, etc.), software (such as is run on a general purpose computer system or a dedicated machine), or a combination of both. Using this process, the base station sets system parameters and notifies relay stations.

Referring to FIG. 2, the process begins by processing logic in a base station determining the MBS tree structure based on one or more constraints (processing block 201). In one embodiment, the constraints include one or more of channel quality, interference issues, load balancing considerations, maximum number of hops allowed between a base station and a mobile station, etc. Note that how the MBS tree structure is set is outside the scope of this invention.

After determining the MBS tree structure, processing logic in the base station selects the ORS based on certain criteria (processing block 202). There are a number of different criteria that can be used. Three such different criteria for selecting the ORSs are described below.

In one embodiment, the selection of an ORS is based on how close an ORS is to the base station in the tree, referred to herein as the depth of the relay station, as well as the total depth of the tree. For purpose herein, let $D_{max}$ denote the number of hops from a relay station at the bottom of a tree to the serving base station (i.e., the depth of the tree). Also, let $N_i$ denote the number of hops from RS-i to the serving base station (i.e., the depth of RS-i). In one embodiment, if $N_i = D_{max}$, then RS-i cannot be an ORS since there is no opportunity for re-transmissions for RS-i without introducing any additional delay to the target transmission time. Moreover, if $N_i < D_{max}$, but RS-i is positioned on a path in the tree where pre-transmissions are propagated to a node at depth $D_{max}$ (i.e., a longest path in the tree), again, RS-i cannot be an ORS without introducing any additional delay. On the other hand, if $N_i < D_{max}$, and RS-i is not positioned on a longest path in the tree, RS-i can potentially be an ORS. It becomes safer to choose RS-i as an ORS if $|D_{max} - N_i|$ is larger because the closer a relay station is to the base station compared to the depth of the tree, the less likely re-transmissions will be finished before the target transmission frame.

In another embodiment, the selection of an ORS is based on the total number of mobile stations served by a relay station. If the relay station is serving to a large number of mobile stations, it should be allowed to use ARQ if it does not introduce any considerable additional delay. For example, it may be preferable to choose a first relay station at depth two as an ORS rather than a second relay station at depth one, if the first relay station is serving to considerably large number of mobile stations. For example, the first relay station may serve to more than 10 mobile stations, while the first relay station serves to 2-3 relay stations.

In another embodiment, the selection of an ORS is based channel qualities of the relay links. If the channel quality is very good, a relay station may not need to use ARQ. Whether the channel quality is very good depends on many factors. For higher order modulation, much higher channel qualities are needed. For example, for BPSK (lowest modulation order), SNRs on the order of 15-20 dB may be satisfactory to operate without ARQ (this also depends on the QoS and bit/packet error rate requirements of specific applications). However, for a relay station that has a relatively poor channel quality and serves to a (relatively) larger number of mobile stations (e.g., on the order of 10 relay stations), it may likely be better to designate that relay station as an ORS. Note that if the number of mobile stations being served is relatively a larger number that may also serve as a decision criteria, e.g., if there are 3 relay stations serving to 10, 10, and 20 mobile stations, respectively, then, the last relay station serving to 20 mobile stations can be selected as an ORS.

Note that all three criteria described above may be used in combination or individually to select an ORS.

After the ORSs have been determined, processing logic at the base station determines the maximum delay that can be tolerated by each of the ORSs (processing block 203). In general, assuming that the delay due to a pre-transmission at a certain hop is only one frame (delay sources such as queuing delay etc. can be easily incorporated in to the general formulation below), the total number of retransmissions at ORSs should satisfy the following $$\sum_{i \in P_j} R^i_{max} \leq |D_{max} - D_j|, \quad (1)$$

where $P_j$ is the set of relay stations on a path j in the tree, $D_j$ is the depth of path j, and $R_{max}^i$ is the maximum number of retransmissions allowed by RS-i (which naturally needs to be an ORS) on path-j. Thus, in one embodiment, the base station sets the re-transmissions times of the ORSs based on equation (1). Note that it may be preferable to allow larger number of re-transmissions at a higher level in the tree since an error will propagate to all the lower level nodes in the tree. As a special case which may occur often in practice, an ORS at a one hop distance to the base station may accommodate up to ($D_{max}$−1) retransmissions.

Once the ORSs and their re-transmission times are determined at the base station, processing logic signals this information to the ORSs (processing block 204).

In one embodiment, the total possible transmission delay that can be tolerated is shared among the ORSs rather than being fixed by the base station at the beginning of the transmission. In such a case, an ORS has to signal the total delay caused by re-transmissions to its children ORSs so that it can use any unused opportunities for correcting potential packet errors. Compared to a fixed setting of the maximum number of retransmissions, this approach is more flexible; however, it requires extra signaling overhead. Using this approach, if there are already $N_r^i$ re-transmissions that occurred by the upper nodes of ORS-i, it can accommodate $$R_{max}^i = D_{max} - N_i - N_r^i \quad (2)$$

re-transmissions with its parent node (ignoring any other delay sources such as the queuing delay).

Decision Mechanism at a Relay Station When a Packet Arrives

Once the ORSs are selected and notified about their maximum number of allowed retransmissions, the packets are pre-transmitted to the relay stations. The manner in which a relay station behaves when it receives a packet depends on whether it is an ORS or not.

Figure 3:
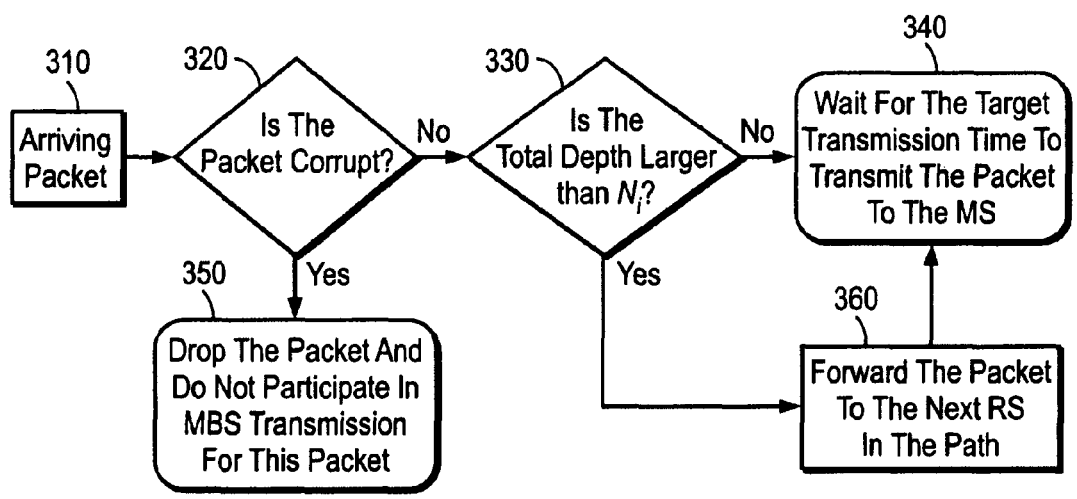
FIG. 3 illustrates a flow diagram of one embodiment of a process for handling a packet performed by a decision mechanism at a non-ORS.

FIG. 3 illustrates a flow diagram of one embodiment of a process for handling a packet performed by a decision mechanism at a non-ORS. The process is performed by processing logic that may comprise hardware (circuitry, dedicated logic, etc.), software (such as is run on a general purpose computer system or a dedicated machine), or a combination of both. This process represents the default mode of operation.

Referring to FIG. 3, the process begins when a packet arrives at the relay station (processing block 310). At this time, processing logic in the decision mechanism first checks if the packet is corrupted or not (processing block 320). If processing logic determines the packet is corrupted, processing logic discards the packet and does not participate in the MBS transmission for the packet (processing block 350). If processing logic determines the packet is not corrupted, processing logic tests whether the relay station is the last node in the tree path (processing block 330). This is accomplished by checking whether the total path depth is larger than $N_i$. If processing logic determines the packet is not corrupted and the relay station is the last node in the tree path, processing logic waits for the target transmission time to transmit the packet to the mobile station (processing block 340). On the other hand, if processing logic determines the packet is not corrupted and the relay station has any other children relay stations (determined by the decision mechanism in processing block 330), processing logic first forwards the packets to these relay stations (processing block 360) then waits for the target transmission time to transmit the packet to the mobile station (processing block 340).

Figure 4:
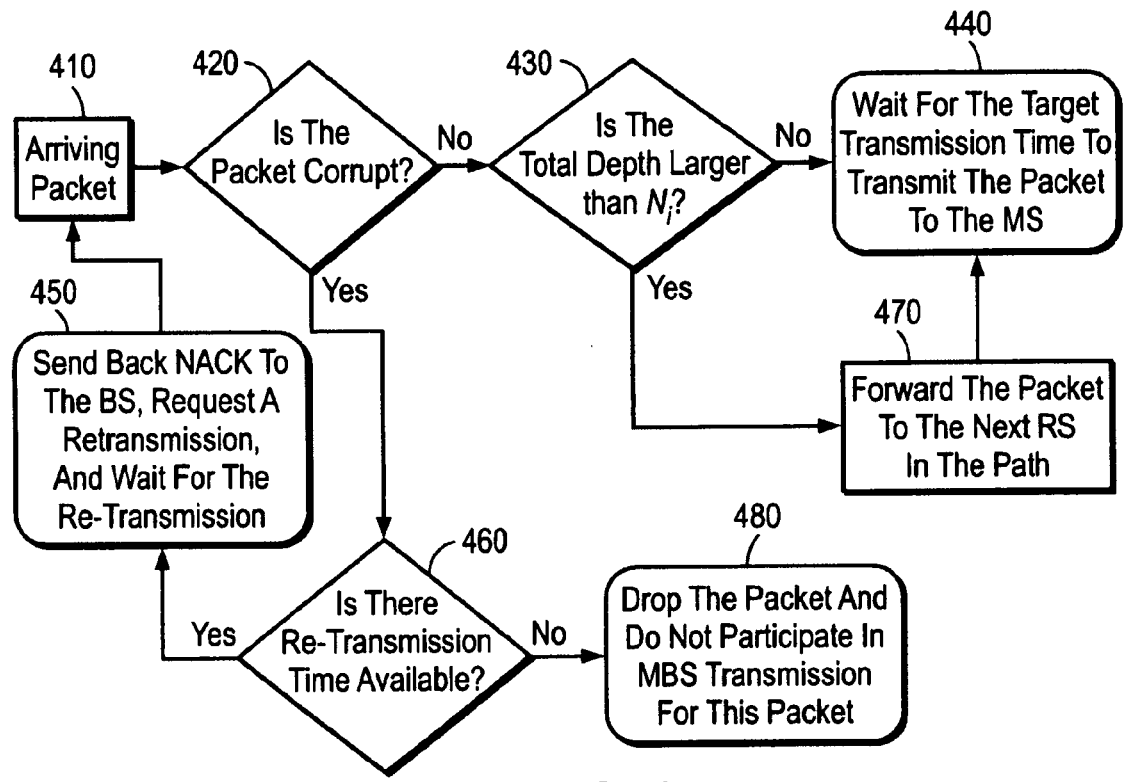
FIG. 4 illustrates a flow diagram of one embodiment of a process for handling a packet performed by a decision mechanism at an ORS.

FIG. 4 illustrates a flow diagram of one embodiment of a process for handling a packet performed by a decision mechanism at an ORS. The process is performed by processing logic that may comprise hardware (circuitry, dedicated logic, etc.), software (such as is run on a general purpose computer system or a dedicated machine), or a combination of both.

Referring to FIG. 4, the process begins when a packet arrives at the relay station (processing block 410). At this time, processing logic in the decision mechanism first checks if the packet is corrupted or not (processing block 420). If processing logic determines the packet is not corrupted, processing logic tests whether the relay station is the last node in the tree path (processing block 430). This is accomplished by checking whether the total path depth is larger than $N_i$. If processing logic determines the packet is not corrupted and the relay station is the last node in the tree path, processing logic waits for the target transmission time to transmit the packet to the mobile station (processing block 440). On the other hand, if processing logic determines the packet is not corrupted and the relay station has any other children relay stations (determined by the decision mechanism in processing block 430), processing logic first forwards the packets to these relay stations (processing block 470) and then waits for the target transmission time to transmit the packet to the mobile station (processing block 440).

If processing logic determines the packet is corrupted at processing block 420, processing logic checks whether there is any re-transmission time available to have an opportunity to ask for a retransmission of the packet from its parent node (processing block 460). If not, processing logic discards the packet and does not participate in the MBS transmission for the packet (processing block 480). On the other hand, if there is any opportunity to accommodate a retransmission (for example, so that equation (1) is satisfied), processing logic of the ORS requests for a retransmission from its parent node and starts waiting for the retransmission packet to arrive (processing block 450). In one embodiment, this is accomplished by processing logic of the ORS sending a NACK to the base station or its parent node, requesting a retransmission, and waiting for the retransmission. Note that in some systems, no specific NACK message is transmitted, and a NACK is implied by an absence of an ACK message.

An Example for Demonstrating the Operation of ARO-Enabled Pre-Transmissions

Below is an example to illustrate the manner in which ARQ is used to improve the reliability of MBS with unicast pre-transmissions.

Figure 5:
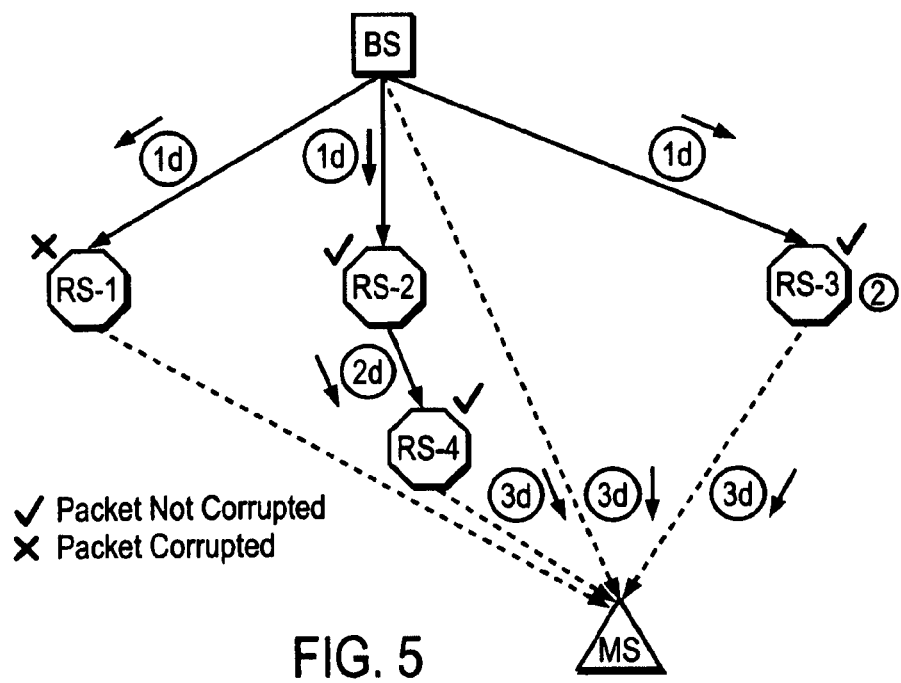
FIG. 5 illustrates an example for conventional pre-transmissions in a relay network.

FIG. 5 illustrates an example for conventional pre-transmissions in a relay network in which no ARQ operation is involved. Referring to FIG. 5, the operation of MBS in the current baseline document of the IEEE 802.16j is illustrated. There are four relay stations, namely RS-1, RS-2, RS-3, and RS-4. RS-1, RS-2, and RS-3 are in one-hop distance to the base station, while RS-4 is in two-hop distance. In order to achieve synchronization, first, the base station pre-transmits, using a unicast connection, the packets to all the relay stations in the one-hop distance in its downlink portion of the first frame. Assume that while RS-2 and RS-3 successfully receive the packets, the RS-1's packets are corrupted, and hence they are dropped. In the downlink portion of the second frame, for synchronization purposes, RS-2 further pre-transmits the packets to RS-4 (which is the children node of relay station-2). Since RS-3 does not have any other children nodes, it waits in idle state in the second frame for the pre-transmissions to complete. In the third frame, once the pre-transmissions are finished, RS-3, RS-4, and the base station synchronously transmit the packets to the mobile station (RS-2 may also join the simultaneous transmissions). Note that RS-1 does not participate in synchronous transmission since the corrupted packets were dropped in the first frame.

As discussed before, the above approach has the disadvantage that the RS-1 and RS-3 (if successfully receive the packets) wait in idle state while the pre-transmissions propagate to all the relay stations. Since there is a opportunity for re-transmissions for RS-1 and RS-3, their idle period can be utilized by allowing ARQ for re-transmission(s) of the corrupted packets. Hence, RS-1 and RS-3 can be selected as ORSs for improving the macro-diversity and increasing the total number of relay stations eventually to be transmitting to the mobile station.

Figure 6:
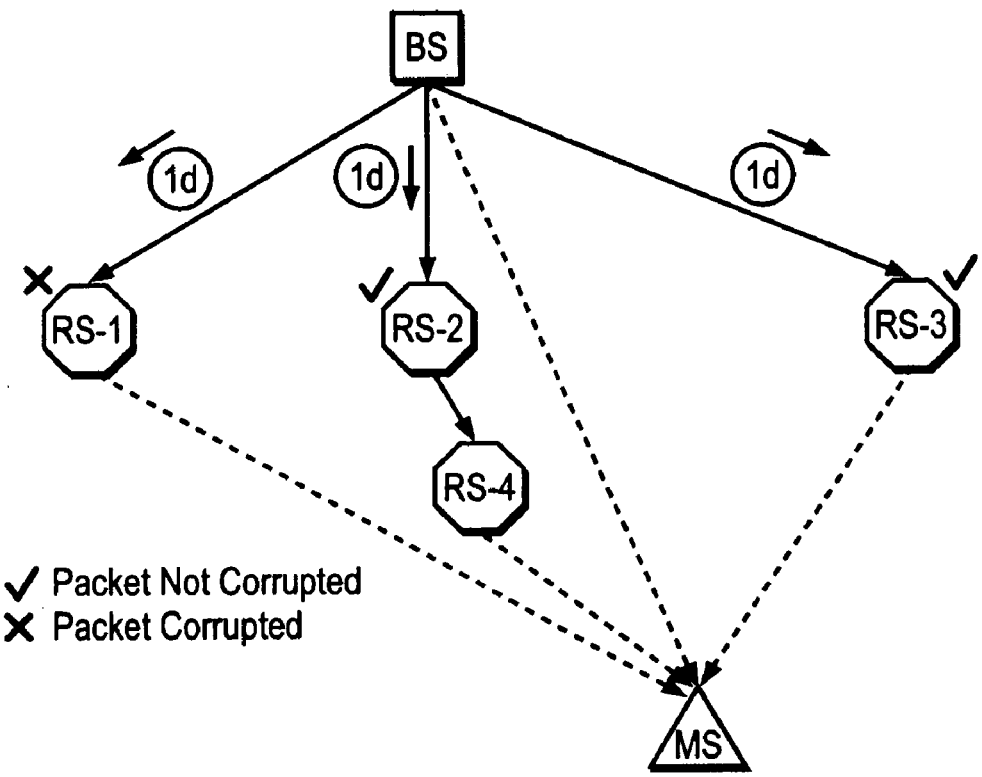
FIG. 6 illustrates the use of pre-transmissions with ARQ for a subset of relay stations (downlink portion of the first frame) in accordance with one embodiment.
Figure 7:
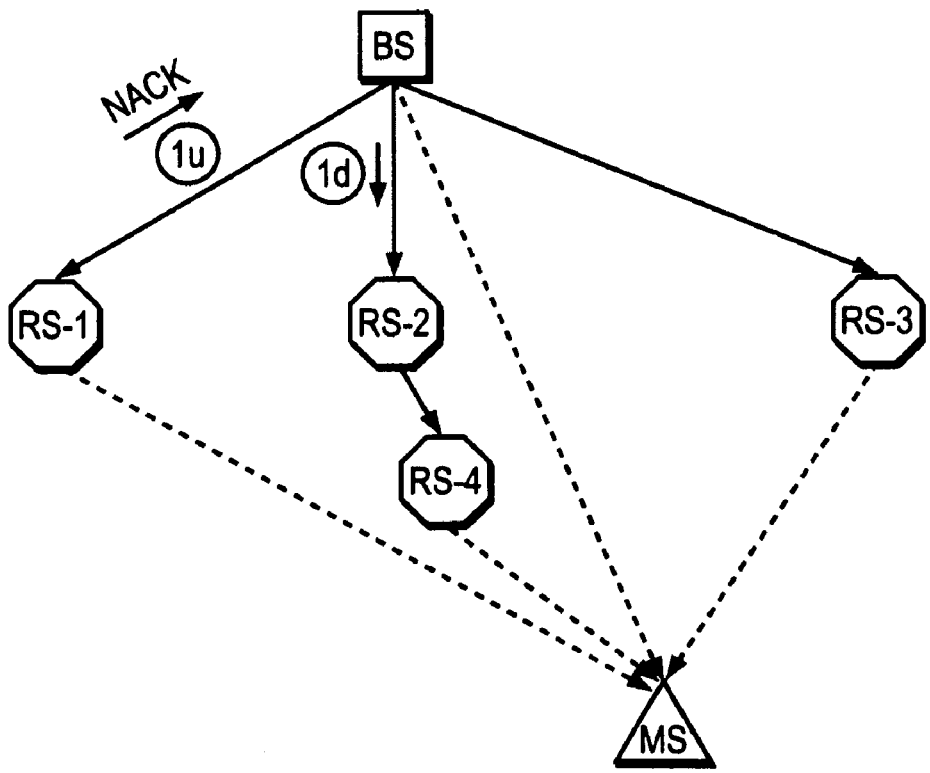
FIG. 7 illustrates the use of pre-transmissions with ARQ for a subset of relay stations (uplink portion of the first frame) in accordance with one embodiment.

The example in FIG. 5 is modified so that RS-1 and RS-3 operate as ORSs in FIG. 6. Referring to FIG. 6, initially, the base station pre-transmits the packet to all the relay stations. Thus, the base station pre-transmits the packets to RS-1, RS-2, and RS-3 in the downlink portion of the first frame, as in conventional pre-transmissions in FIG. 5. RS-1 checks the packets and determines that they are corrupted. In a conventional scheme, as outlined in FIG. 5, these packets would be dropped at RS-1 and would not be forwarded to the mobile station. In one embodiment of the present invention illustrated in FIG. 7, the use of pre-transmissions with ARQ for a subset of relay stations (uplink portion of the first frame) occurs. Referring to FIG. 7, RS-1 fails to receive the packets correctly and hence sends back a NACK message to the base station. However, RS-1 is pre-selected as an ORS that has a time period before the target transmission frame that can be utilized using ARQ. Hence, RS-1 sends back a NACK message to the base station in the uplink portion of the first frame, requesting a re-transmission. As for RS-2, it does not operate in the ARQ mode, and hence, it waits for the next frame for transmitting the packets to its children node (i.e., RS-4). Note that it may also be possible that RS-2 may choose to operate in ARQ mode; however, this introduces additional overall latency, and the target transmission frame should be incremented appropriately. RS-3 also operates in ARQ mode; however, it receives the packets correctly as opposed to RS-1 in this particular example.

Note that after retransmissions, the ORSs should be able to meet the target transmission frame deadline. In one embodiment, the NACK message is sent in the uplink portion of the same frame, and the parent node re-transmit in the downlink portion of immediately following frame. In one embodiment, all the pre-transmissions are handled through unicast connections.

Figure 8:
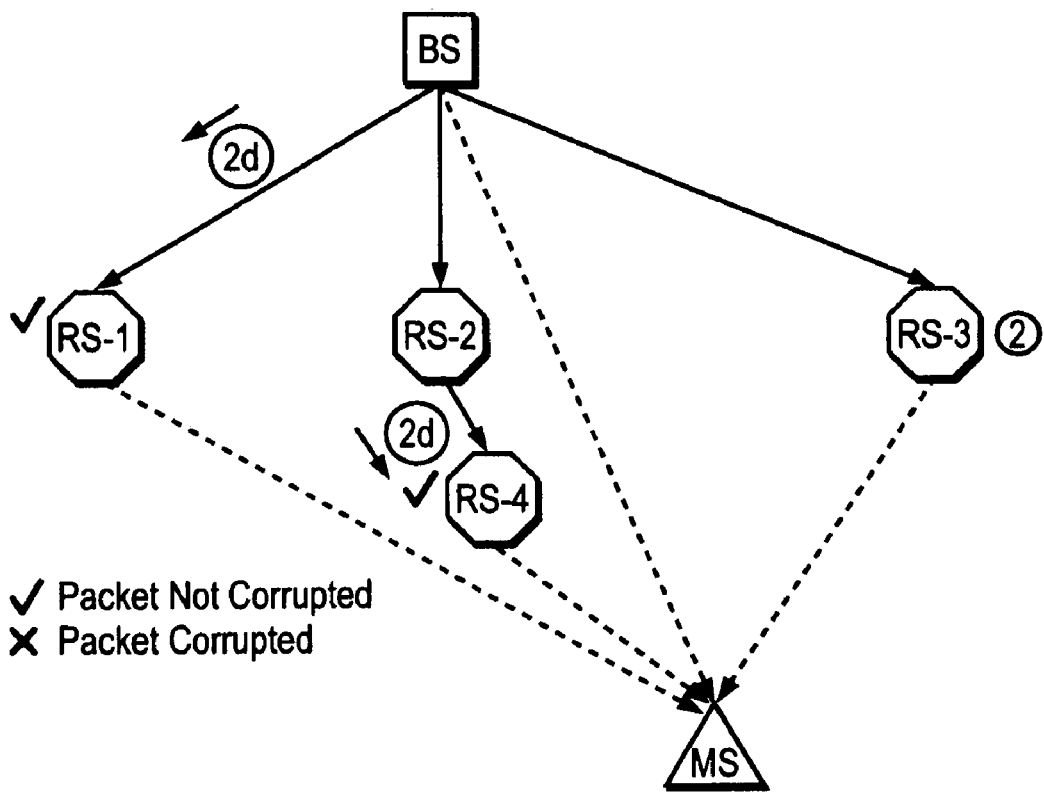
FIG. 8 illustrates the use pre-transmissions with ARQ for a subset of relay stations (downlink portion of the second frame) in accordance with one embodiment.

FIG. 8 illustrates the use of pre-transmissions with ARQ that occur in the downlink portion of the second frame for a subset of relay stations in accordance with one embodiment. Referring to FIG. 8, the base station responds to the NACK message of RS-1, and re-transmits the packets. RS-1 receives the re-transmitted packet correctly in the second attempt. At the same time, RS-2 forwards the packets to RS-4, which are received successfully. Since RS-3 received the packets successfully during the first frame, it waits in idle state during the downlink portion of the second frame.

Figure 9:
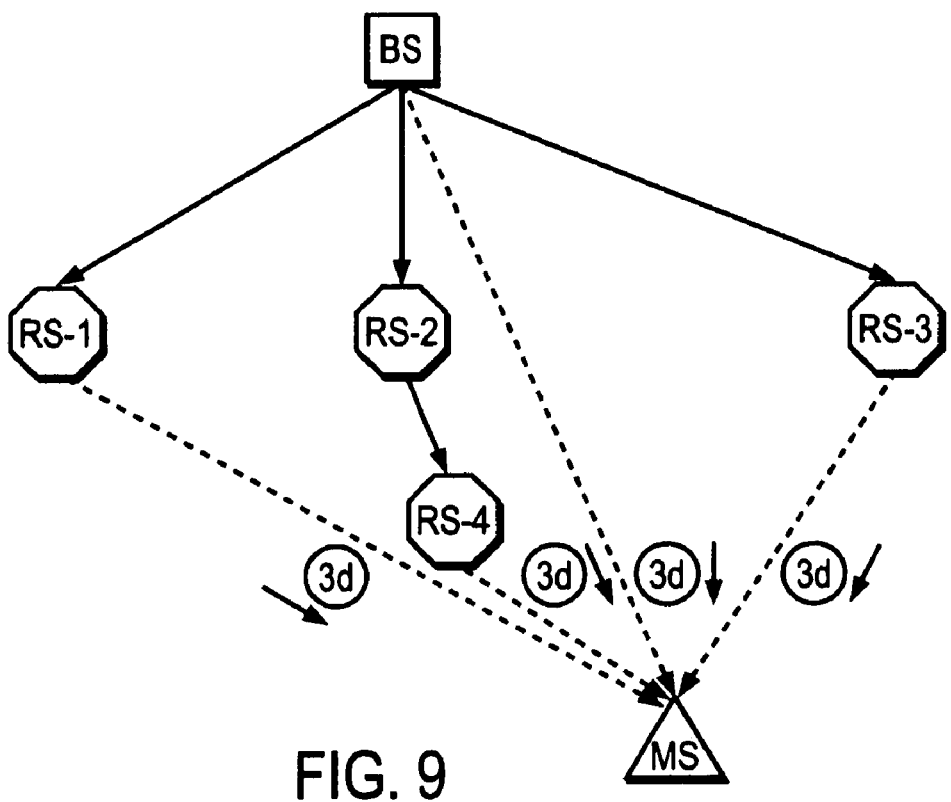
FIG. 9 illustrates the use of pre-transmissions with ARQ for a subset of relay stations (downlink portion of the third frame) in accordance with one embodiment.

FIG. 9 illustrates the use of pre-transmissions with ARQ for a subset of relay stations (downlink portion of the third frame) in accordance with one embodiment. Once all the relay stations successfully receive the packets, the relay stations as well as the base station transmit the packets synchronously to the mobile station.

Comparing the ARQ-free and the ARQ-enabled pre-transmissions in FIG. 5 and FIGS. 6-9, respectively, it is shown that when the ARQ is enabled for some ORSs, larger number of relay stations can get involved in the synchronous transmission to the mobile station. This yields improved macro-diversity in a relay network and lower packet error rates.

Embodiments of the present invention provide a number of advantages. Some of these advantages include improving the link-layer reliability of some relay stations in MBS, introducing no additional latency for ARQ since the idle periods are utilized, and eventually, the mobile station receives signals from a larger number of relay stations since ARQ decreases the chances of packets being corrupted and dropped at intermediate relay stations. This results in an improved macro-diversity and it yields better signal quality due to receiving signals from multiple destinations and makes the handover process much easier.

FIG. 10 is a method for handling re-transmissions of packets. Referring to FIG. 10, the method comprises constructing a tree structure depicting a topology of a wireless communication network having at least one base station and a plurality of relay stations (1001); selecting a set of one or more relay stations from the plurality of relay stations (1002); determining a maximum delay for each relay station in the selected set of relay stations, where the maximum delay is a period of time in which at least one request for re-transmission of a packet and the receipt of the packet after re-transmission can occur (1003); and allowing each of the selected set of relay stations to request re-transmissions from their parent relay station or the base station during idle periods in which said each relay station is waiting for pre-transmissions of packets to arrive at other relay stations in the network (1004).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use in a wireless communication system having at least one base station and a plurality of hops, the method comprising:
   performing pre-transmission of a packet to hops to enable the base station and the plurality of hops to transmit the packet synchronously to one or more mobile stations in the wireless communication system;
   wherein the packet is determined to be corrupted as received by at least one but less than all of the plurality of hops during the pre-transmission; and
   performing one or more re-transmissions of the packet to the at least one but less than all of the plurality of hops, in response to the packet being determined to be corrupted during the pre-transmission by a first set of one or more hops in the system during a delay due to pre-transmissions to a second set of one or more hops in the system.

2. The method defined in claim 1 wherein performing one or more re-transmissions of the packet comprises:
   performing the one or more re-transmissions of the packet to at least one but less than all of a plurality of relay stations during periods in which the relay stations are waiting for one or more pre-transmissions of the packet to propagate to at least one other relay station, the one or more re-transmissions being finished before a target transmission time at which the base station and the plurality of relay stations are to transmit the packet synchronously to the one or more mobile stations.

3. The method defined in claim 1 wherein each of the hops comprises a relay station.

4. The method defined in claim 1 wherein the first set of one or more hops is closer to the base station than the second set of hops.

5. The method defined in claim 1 wherein the pre-transmissions are unicast pre-transmissions.

6. The method defined in claim 1 wherein idle periods are used for automatic repeat request (ARQ) with the re-transmissions being part of the ARQ process.

7. The method defined in claim 1 wherein the plurality of hops comprise a plurality of relay stations, and wherein the packet is pre-transmitted through unicast connections and further wherein automatic repeat requests (ARQ) is used for the one or more re-transmissions of the packet to the at least one but less than all of the plurality of relay stations.

8. The method defined in claim 1:
   wherein the plurality of hops comprise a plurality of relay stations, and
   wherein the method further comprises at least one but less than all of the plurality of relay stations sending back a NACK message to the base station when the packet is determined to be corrupted during the pre-transmission at the at least one but less than all of the plurality of relay stations.

9. The method defined in claim 1 wherein the first set of one or more hops comprise one or more relay stations, and further comprising selecting the one or more relay stations, based on depth of each relay station in a tree structure representing the topology of the wireless communication network in comparison to a total tree depth of the tree structure, for use of one or more re-transmissions if the packet is not received correctly.

10. The method defined in claim 1 wherein the first set of one or more hops comprise one or more relay stations, and further comprising selecting the one or more relay stations, based on a number of mobile stations served by each relay station, for use of one or more re-transmissions if the packet is not received correctly.

11. The method defined in claim 1 wherein the first set of one or more hops comprise one or more relay stations, and further comprising selecting the one or more relay stations, based on channel quality of a channel to each relay station from either another relay station or the base station, for use of one or more re-transmissions if the packet is not received correctly.

12. The method defined in claim 1 wherein performing one or more re-transmissions of the packet to the at least one but less than all of the plurality of hops comprises performing a predetermined number of re-transmissions to at least one relay station.

13. The method defined in claim 12 wherein a first relay station of the plurality of relay stations is allowed a greater number of re-transmissions than a second relay station.

14. The method defined in claim 13 wherein the first relay station is closer to the base station than the second relay station.

15. The method defined in claim 12 wherein the predetermined number of re-transmissions is dependent on depth of the relay station in a total depth of the tree.

16. The method defined in claim 1 wherein the re-transmissions are performed using HARQ.

17. A method comprising:
   constructing a tree structure depicting a topology of a wireless communication network having at least one base station and a plurality of relay stations;
   selecting, by a base station controller, a set of one or more relay stations from the plurality of relay stations;
   determining a maximum delay for each relay station in the selected set of relay stations, the maximum delay being a period of time in which at least one request for re-transmission of a packet and the receipt of the packet after re-transmission can occur; and
   allowing, by the base station controller, the selected set of relay stations to:
      determine the packet is corrupted as received by at least one but less than all of the selected set of relay stations during a pre-transmission to the selected set of relay stations, and
      request one or more re-transmissions of the packet to the at least one but less than all of the selected set of relay stations, in response to the packet being determined to be corrupted during the pre-transmission from their parent relay station or from the base station during idle periods in which said each relay station is waiting for pre-transmissions of packets to arrive at other relay stations in the network.

18. The method defined in claim 17 further comprising:
   selecting a maximum number of transmissions for each of the selected relay stations; and
   notifying the selected relay stations about their respective maximum number of transmissions.

19. A relay station for use in a wireless communication system having at least one base station and a plurality of other relay stations, wherein the at least one base station and one or more relay stations pre-transmit a packet to other relay stations to enable the base station and the plurality of relay stations transmit a packet synchronously to one or more mobile stations in the system, the relay station comprising:
   a receiver to receive pre-transmitted packets;
   processing logic to determine the packet is corrupted as received by the relay station during the pre-transmit of the packet to the one or more relay stations from the base station, wherein the packet is corrupted as received at one or more but less than all of the relay station and the plurality of other relay stations, and a repeat request mechanism to request a re-transmission of the packet from the base station to the relay station in response to the packet being determined to be received corrupted during pre-transmission of the packet, wherein at least one but less than all of the relay station and the plurality of other relay stations request the re-transmission of the packet, the repeat request mechanism being operable to request the re-transmission of a packet corrupted in a previous transmission, while waiting for other pre-transmissions of the packet to complete.

20. A wireless communication system having the relay station and the base station defined in claim 19, wherein the base station comprises:
- a transmitter to send pre-transmitted packets;
- a selection unit to select at least one but less than all of the relay station and the plurality of other relay stations to enable use of their respective repeat request mechanism to receive one or more re-transmissions of a packet if the packet is not received correctly.

21. The method of claim 1, further comprising:
- determining there is re-transmission time available to ask for a retransmission of the packet from a parent node; and
- wherein performing the one or more re-transmissions of the packet to the at least one but less than all of the plurality of hops is in response to:
  - (i) the packet being determined to be corrupted during the pre-transmission, and
  - (ii) the determination there is re-transmission time available to ask for the retransmission of the packet from the parent node.

22. The method of claim 21, wherein the re-transmission time available constitutes a period of time subsequent to the pre-transmission and prior to the plurality of hops transmitting the packet synchronously to the one or more mobile stations in the wireless communication system.

* * * * *